Feb. 10, 1959 E. J. SASS ET AL 2,873,309

RADIO COMMUNICATIONS SYSTEMS

Filed Aug. 2, 1952

INVENTORS
EARL J. SASS &
ALTON J. TORRE
BY [signature]
ATTORNEY

United States Patent Office 2,873,309

Patented Feb. 10, 1959

2,873,309

RADIO COMMUNICATIONS SYSTEMS

Earl J. Sass, Oaklyn, and Alton J. Torre, Woodbury, N. J., assignors to Radio Corporation of America, a corporation of Delaware Application August 2, 1952, Serial No. 302,332

7 Claims. (Cl. 178—5.4)

Figures 1, 2:
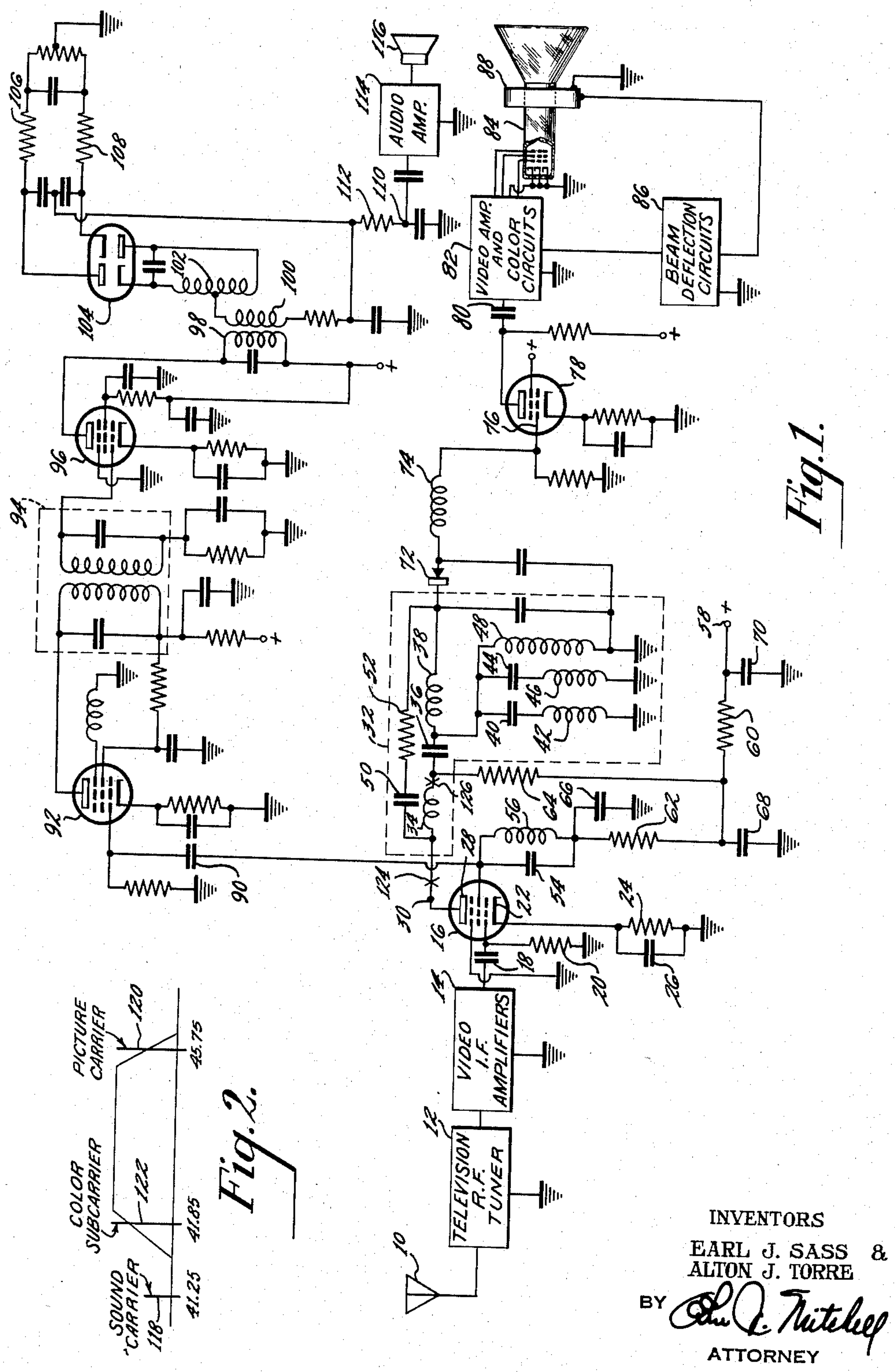

The present invention relates to improvements in radio communications systems, particularly of the type involving a composite intelligence signal comprising a plurality of carrier and sub-carrier elements.

More directly, although not necessarily exclusively, the present invention deals with improved receiving systems for television type signals of a number of components including a sound and picture carrier, as well as an additional color sub-carrier in color type television systems.

Although the present invention yields benefits in the black and white television art, even greater benefits are realized from its use in connection with color television receiving arrangements. For example, at present, some color television practice involves a color television signal having three major components, a sound carrier, a picture carrier and a color sub-carrier. The sound and picture carrier elements are, of course, found in the black and white television art whereas the color sub-carrier is unique to color television practice. In television receiving arrangements of either type where the sound channel is of the intercarrier type, reliance is made upon the heterodyne or beat between the sound carrier and the picture carrier. This beat, or heterodyne, is passed on to a frequency discriminator circuit which detects the frequency modulation of the beat and reproduces FM sound information.

However, in color television receiving systems it is important that the sound carrier level at the second detector of the television receiver be approximately 500 times below the amplitude of the color sub-carrier in order that cross modulation between the sound carrier and the color sub-carrier not be produced. This requirement is supplemented by the further requirement that the sound carrier at the point where it is extracted for heterodyning or beating wtih the picture carrier to produce the intercarrier sound beat, be not more than twenty times below the picture carrier, in order that the sound be free from picture carrier cross modulation and noise.

Since the picture carrier and color sub-carrier of a composite color signal are normally one-third to two-third times down on the overall I.-F. response of the television receiver, it is apparent that a means must be used to reduce the amplitude of the sound carrier ahead of the television receiver second detector in order that the above described cross modulation effects be minimized.

In accordance with the present invention, the intercarrier sound beat is detected in the output stage of the last I.-F. amplifier. The intercarrier beat is then applied to an intercarrier sound channel which directly feeds an FM discriminator from which the sound envelope is demodulated. The output of the last I.-F. amplifier is applied through a band-pass filter. Under such conditions the sound carrier is attenuated so that cross modulation effects have been virtually eliminated.

It is, therefore, an object of the present invention to provide a new and improved receiving system for composite signals having a plurality of carrier and/or subcarrier components.

It is another object of the present invention to provide an improved television sound receiving system of the intercarrier type.

It is another object of the present invention to provide an improved color television receiving system of a type minimizing the undesirable cross modulation between elements of the television signal.

It is further an object of the present invention to provide an improved color television receiving system of a type providing substantially noise free sound and minimum cross modulation between the color carrier and sound carrier.

A better understanding of the operating principles and nature of the present invention as well as other objects and features of advantage will be obtained through a reading of the following description, especially when taken in connection with the accompanying drawings, in which Fig. 1 is a combination block and schematic representation of one form of the present invention.

Fig. 2 is a graphical presentation of the relationship existing between certain signal elements which may be encountered in the practice of the present invention.

Turning now to Fig. 1, there is shown at 10, a television receiving antenna whose output is adapted to feed a television R.-F. tuner 12. The intermediate frequency output of the television tuner 12 is applied to a plurality of video I.-F. amplifiers 14, adapted to drive the last video I.-F. amplifier 16. Coupling between the last I.-F. amplifier 16 and the previous I.-F. amplifiers 14 is accomplished by capacitor 18. Resistance 20 provides a suitable ground return for the control electrode of the amplifier 16. The cathode 22 of amplifier 16 is connected with a datum or ground potential through cathode resistance 24, which is in turn bypassed by capacitor 26. The anode 28 of the amplifier 16 is connected to input terminal 30 of a band-pass filter circuit shown in the dotted line area 32. The filter circuit 32 may take a variety of forms in the practice of the present invention, but for purposes of convenience it has been shown in Fig. 1 to be of the "M" derived bridge type filter, comprising an inductance 34, capacitor 36, inductance 38, capacitance 40, inductance 42, capacitance 44, inductance 46, inductance 48, capacitance 50 and resistance 52. "M" derived bridge type filters are well known in the art and need no specific description. It is useful to remember, however, that in the specific filter arrangement shown, the two series resonant coupling branches comprising capacitance 40, inductance 42 and capacitors 44 with inductance 46 act as traps to the frequencies at which they are tuned. In the practice of the present invention, one network is tuned to the frequency of one of the carriers normally instrumental in producing undesirable cross modulation, for example, the frequency of the sound carrier.

In further accord with the present invention, a tuned circuit comprising the capacitor 54 and inductance 56 is placed at any convenient position in the output circuit of the last I.-F. amplifier and at a point prior to the connection of the "M" derived filter. As shown in the figure, the tuned circuit 54—56 is connected in the screen circuit of the amplifier 16. Both anode and screen supply potential is derived from a power supply terminal 58 through the decoupling resistor 60. Screen supply is drawn through resistance 62, while anode supply is taken through resistance 64. Capacitors 66, 68 and 70 provide well known decoupling action to prevent current variations from the amplifier 16 from appearing at the positive supply terminal 58.

The output of the filter 32 is applied to a unilateral conducting element such as the rectifier 72, acting as a second detector in the television system. The signal appearing at the output of detector 72 is applied through inductance 74 to the control electrode 76 of a conventional video amplifier 78. The output of the video amplifier 78 is coupled through capacitor 80 to one or more successive video amplifiers 82, designated for driving the kinescope 84. The block 82 also may include suitable color commutation circuits for supplying the kinescope 84 with three color television information to its respective color guns. Synchronizing information is extracted from the video amplifier and color circuits 82 for control of the beam deflection circuit 86, the output of which is coupled to the deflection yoke 88.

In further accordance with the present invention, the tuned circuit 54—56 is resonated at the intercarrier beat frequency between the sound carrier and picture carrier. This beat, 4.5 mc. as in previous television practice is applied through capacitor 90 to the input of amplifier 92. The output of amplifier 92 is transformer coupled via the transformer shown enclosed in dotted line area 94 to the input of a second amplifier 96. The output of the amplifier 96 is in turn connected with a well known radio detector type frequency discriminator transformer, having its primary 98, and its secondary windings at 100 and 102. Through the use of the double diode 104 connected with the load resistors 106 and 108, audio output voltage is developed at terminal 110 of resistance 112. This output voltage is applied to a standard audio amplifier 114, feeding the sound reproducer 116.

Suitable circuitry for inclusion in the blocked-in elements shown and discussed above as well as throughout this entire specification are well known in the art and are to be found in the literature, for example, in the "Radio Electronics Magazine," for November 1950, pages 34–36, under the title of "Radio Set and Service Review" and also in the "RCA Review" of March 1947, on pages 5 through 28 thereof.

In understanding the operation of the present invention it is well to consider the arrangement of the elements comprising a standard black and white television and color television signal inclusive of the sound components. There is shown in Fig. 2 the approximate relationship between the sound carrier 118, the picture carrier 120 and color sub-carrier 122. The black and white television signal, of course, is substantially the same as a color signal except that the color sub-carrier is absent. In the now currently popular 40 mc. I.-F. systems for television receivers, the sound carrier 118, picture carrier 120 and sub-carrier 122 may be represented by the respective frequencies of:

| | Mc. |
|---|---|
| I.-F. sound carrier | 41.25 |
| I.-F. picture carrier | 45.75 |
| I.-F. color sub-carrier | 41.85 |

The intercarrier sound beat produced between the sound carrier 41.25 mc. and the picture carrier 45.75 mc. (see an article "Design Factors" by S. W. Seely in "Electronics," July 1948) will be detected in the tuned circuit 54—56 in the screen circuit of the amplifier 16 in Fig. 1. This 4.5 mc. beat is processed by the sound channel as briefly described above in a standard fashion. It is important to note in the practice of the present invention that the amplitude of intercarrier beat developed in the tuned circuit 54—56 is a function of the non-linearity of the last I.-F. amplifier stage 16. In accordance with the present invention, this non-linearity is enhanced by coupling the last I.-F. stage to a trap circuit for the sound carrier frequency through a reactive impedance such as for example the elements 34 and 36 of the filter 32. The series tuned circuit 40—42 is tuned to the sound carrier frequency and acts as a trap. Thus, upon arrival of the output signal of the I.-F. amplifier 16 at sound detector 72, the sound carrier component has been greatly attenuated, thereby minimizing bothersome cross modulation between the color sub-carrier and the sound carrier.

Furthermore, since there has been no need in accordance with the present invention for excessively attenuating the sound carrier, per se, at any point in the television system prior to the last I.-F. amplifier, there will exist an optimum ratio between the level of the sound carrier and the level of the picture carrier, whereby to produce substantially noise free sound at the output of the intercarrier sound channel.

In the practice of the present invention, it has been found that the parallel resonant 4.5 mc. takeoff circuit for the intercarrier beat may be connected in series with the circuit connections indicated by the "X's" at 124 and 126 in the anode circuit of the last I. F. amplifier. Furthermore, although the "M" derived filter shown in the dotted line area 32 is sometimes preferred for use in accordance with the present invention, it is to be understood that other networks having trap characteristics at at least one of the carrier or sub-carrier frequencies involved, may be used. In the "M" derived filter arrangement shown at series resonant circuit 44—46 may be tuned to the adjacent television channel sound carrier, so as to prevent possible adjacent channel sound interference.

Although the above description of the operation of the present invention has been more or less directed to its use in color television systems, it will be appreciated, as pointed out briefly above, that the present invention may profitably be employed in monochrome television systems. In most monochrome television systems employing intercarrier sound reception, the sound carrier oftentimes produces undesirable cross modulation with the picture carrier at the second detector. By utilizing the present invention, this cross modulation is prevented in substantially the same manner as described above in connection with the sound carrier and color sub-carrier.

It is, therefore, seen that the present invention has provided a novel signal processing circuit for use in radio receiving systems adapted to receive composite signals having a plurality of carrier or sub-carrier elements. The arrangement of the present invention permits processing of the signal so as to accentuate certain desirable interactions between two or more signal elements while attenuating undesirable interaction between other elements of the composite signal.

What is claimed is:

1. In a television signal receiving system adapted to receive and utilize a composite television signal embracing a plurality of carrier and subcarrier components, and including means for utilizing heterodyne components representative of the beat between two of said signal components, the cross modulation between one of said two signal components and another but different component of said signal being undesirable, the combination of an amplifier stage responsive to said received composite television signal and adapted to communicate signal frequencies representing all of said components, means providing a takeoff circuit for said heterodyne components and comprising a parallel resonant circuit coupled to an output of said amplifier stage and tuned to the frequency of the beat between said two signal components, means including a passive network coupled to an output of said amplifier stage for attenuating one of said two signal components, a detector stage, and means for coupling the output of said attenuating means to the input of said detector stage.

2. In a radio signal receiving system adapted to concomitantly receive a plurality of modulated signal frequencies, the combination of a non-linear signal amplifier adapted to pass simultaneously all of said frequencies, a tuned circuit resonant to the heterodyne frequency between two designated constituents of said signal frequencies, means for coupling said tuned circuit to an output of said signal amplifier for excitation thereby, means for coupling the signal developed in said tuned circuit to a first utilization means responsive to the heterodyne frequency, a second utilization means responsive to the modulation envelope of at least one of said signal frequencies, a passive network designed to attenuate but one of said two designated constituents, a non-linear modulation detector for reproducing the modulation envelope desirably utilized by said second utilization means, means for coupling the output of said modulation detector to the input of said second utilization means, connections from the output of said passive network to the input of said modulation detector and a coupling reactance connected from an output of said amplifier to the input of said passive network.

3. In a superheterodyne radio receiver having a plurality of intermediate frequency amplifiers immediately followed by a detector stage, said receiver being designated to receive concomitantly at least two signal carriers each modulated with signal information, the combination of a tuned circuit resonant to the beat frequency between said two carriers, a means coupling said tuned circuit to an output of the intermediate frequency amplifier immediately preceding the receiver detector stage, a passive network designed to attenuate but one of said signal carrier frequencies, connections placing said passive network between an output of the last intermediate frequency amplifier and said detector stage, and a reactance connected in series with the output of said last intermediate frequency amplifier and the input of said passive network.

4. In a superheterodyne television receiver, having a plurality of intermediate frequency amplifiers, the last of said intermediate frequency amplifiers being designated for coupling to a detector stage, said receiver being indicated to receive concomitantly a television picture carrier and a television sound carrier, the combination of, a tuned circuit resonant to the difference frequency between said sound carrier and said picture carrier, connections from said tuned circuit to said intermediate frequency amplifier for excitation thereby, a passive network having an attenuation characteristic at the sound carrier frequency, a connection from the output of said passive network to the input of said detector stage and a reactance connected from the output of said last intermediate frequency amplifier to the input of said passive network.

5. Apparatus according to claim 4, wherein said last intermediate frequency amplifier includes an electron discharge tube having at least a screen electrode with appropriate power supply connections thereto and wherein the connection of said tuned circuit to said last intermediate frequency amplifier comprises the series connection of said tuned circuit in the power supply connections to said screen electrode.

6. In a superheterodyne color television receiver having a plurality of intermediate frequency amplifier stages, the last of which is designated for coupling to a detector stage, said color television receiver being indicated to receive concomitantly a television sound carrier and a television picture carrier, said television picture carrier being modulated by a color sub-carrier, the combination of a resonant circuit tuned to the difference frequency between said sound carrier and said picture carrier, connections coupling said resonant circuit to said last intermediate frequency amplifier for excitation thereby to produce an intercarrier sound beat, a passive network having at least one trap frequency established at the sound carrier frequency, a coupling reactance connected from the output of said last intermediate frequency amplifier to the input of said passive network and coupling means connected from the output of said passive network to the input of said detector stage.

7. In a color television receiver adapted to receive and utilize a composite color television signal embracing a plurality of carrier and subcarrier components including a picture carrier, a color subcarrier, and a frequency modulated sound carrier, and including sound translating means for utilizing heterodyne components representative of the intercarrier beat between said picture carrier and said modulated sound carrier and picture translating means for utilizing the color subcarrier components of said received composite signal, the appearance of products of cross modulation between said sound carrier and said color subcarrier in said picture translating means being undesirable, the combination of an intermediate frequency amplifier stage responsive to said received composite color television signal and adapted to communicate signal frequencies representing all of said carrier and subcarrier components, means providing a sound takeoff circuit for said heterodyne components and comprising a parallel resonant circuit coupled to an output of said intermediate frequency amplifier stage and tuned to the frequency of the intercarrier beat between said picture carrier and said sound carrier, means including a passive network coupled to an output of said intermediate frequency amplifier stage for attenuating the modulated sound carrier component of said composite color television signal, a video detector stage having an input and an output, means for coupling the output of said attenuating means to the input of said detector stage, means for coupling said color subcarrier component utilization means to the output of said detector stage, and means for coupling said heterodyne components utilization means to said sound takeoff circuit, the coupling of said parallel resonant circuit to an output of said intermediate frequency amplifier stage being independent of said attenuating means and said video detector stage.

References Cited in the file of this patent

UNITED STATES PATENTS

| | | |
|---|---|---|
| 2,291,277 | Case | July 28, 1942 |
| 2,677,724 | Parker | May 4, 1954 |

OTHER REFERENCES

"Radio and Television News" for June 1949, pages 41–43, 84, 86 and 88.